Feb. 27, 1962     B. J. HEISER     3,022,848
PROTECTIVE HOOD SHIELD FOR VEHICLES
Filed Sept. 28, 1959
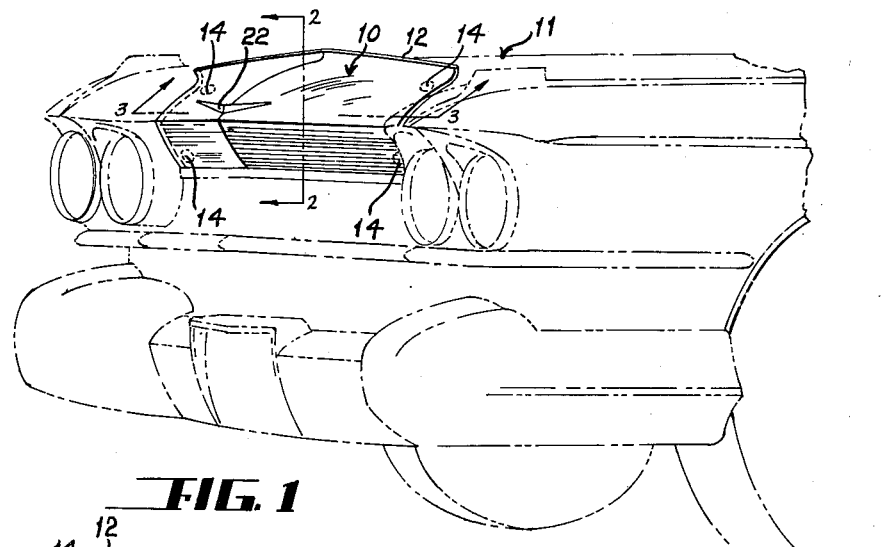
FIG. 1
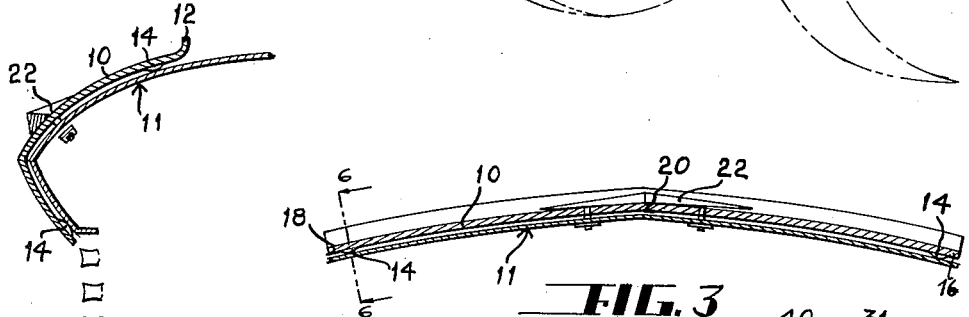
FIG. 2     FIG. 3
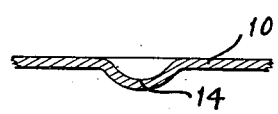
FIG. 6
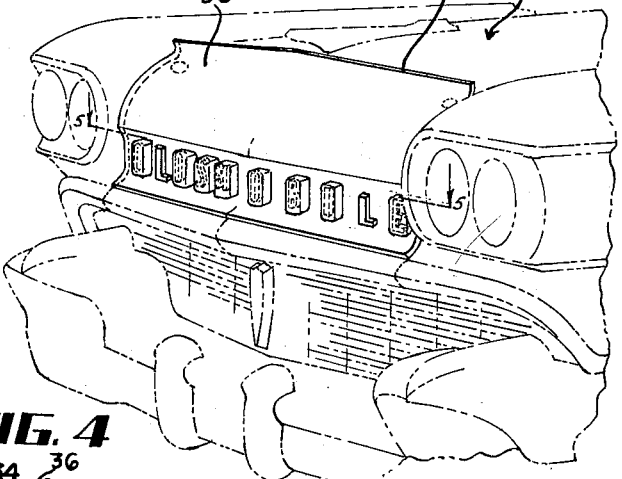
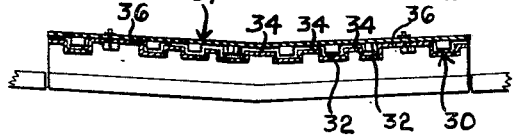
FIG. 5     FIG. 4
INVENTOR.
BENNETT JOHN HEISER
BY
HIS ATTORNEYS 3,022,848
                                                                                                            Patented Feb. 27, 1962

3,022,848
PROTECTIVE HOOD SHIELD FOR VEHICLES
Bennett John Heiser, 185 W. Sugartree St.,
Wilmington, Ohio
Filed Sept. 28, 1959, Ser. No. 842,887
3 Claims. (Cl. 180—69)

This invention relates to a protective shield for protecting the forwardly directed portion of the hood of a motor vehicle, such as automobiles, trucks and tractors, although not necessarily so limited, in that the shield may be used for protecting other portions than the forward end of the hood.

Various types of devices have been developed for the purpose of deflecting bugs and other foreign objects from the windshield of an automobile. Others have been designed to deflect foreign objects from the forward end of an automobile, which devices require rather elaborate constructions. Users of exclusive motor vehicles, such as Lincolns, Cadillacs and other expensive automobiles, are rather insistent that there be no mars and no mutilation of the exposed painted surface. One of the more vulnerable areas of a motor vehicle is the forward portion of the hood which extends over the engine and then is curved downwardly, so as to be hooked in position directly above the grill. Bugs, stones and other foreign objects oftentimes mar the paint, so that it is necessary to have the forward portion of the hood repainted. Usually, this requires the entire hood to be painted, in that it is difficult to match a patched job of paint.

An object of this invention is to provide a shield fitting, or substantially fitting, the forward portion of the hood of a motor vehicle, the shield over most of the area being spaced a short distance from the forward portion of the hood, so that it will not mar or mutilate the paint.

Another object of this invention is to provide a shield that is transparent and may be made from a sheet of plastic material that is formed by softening the plastic material, either by the application of heat or by a solvent, and then placing the sheet of plastic material over a form, where the sheet is drawn by vacuum towards the form, so as to conform to the shape of the form. This eliminates the necessity for the use of expensive dies or molds for forming the plastic material.

Another object of this invention is to form a shield that has an inherent curvature that has a radius of curvature less than the radius of curvature of the forward end of the hood, so that by forming dents or squirts in the shield, the shield will rest upon the dents or squirts. The center of the shield may then be clamped into position by an emblem, the only portions coming into contact with the hood being those lying directly under the emblem and those contacting the inwardly directed dents or squirts.

Other objects and advantages reside in the construction of parts, the combination thereof, the method of manufacture and the mode of operation, as will become more apparent from the following description.

In the drawings, FIGURE 1 is a perspective view of a shield mounted on a motor vehicle, a portion of which is shown in phantom.

FIGURE 2 is a cross sectional view on a slightly larger scale, taken substantially on the line 2—2 of FIGURE 1.

FIGURE 3 is a cross sectional view, taken substantially on the line 3—3 of FIGURE 1.

FIGURE 4 is another perspective view of a shield used on another motor vehicle shown in phantom, wherein letters or words are mounted on the forward end of the hood.

FIGURE 5 is a cross sectional view of the shield and a portion of the hood, taken substantially on the line 5—5 of FIGURE 4 and directly above the word.

FIGURE 6 is a cross sectional view, taken substantially on the line 6—6 of FIGURE 3.

Referring to the drawings, the shield 10 is preferably made from a sheet of transparent plastic material that has been formed by the use of a vacuum process, wherein the piece of sheet material is drawn against a form while in a plastic state, as for example, by the application of heat or by the application of a suitable solvent. This shield 10 is provided with an upwardly directed portion 12 extending along the top of the shield, so as to deflect bugs and other foreign matter. Inwardly directed dents or squirts 14 are formed in the ends of the shield. There may be two or more of these dents. The shield, as shown in FIGURE 3, has a radius of curvature slightly less than the radius of curvature of the hood 11, so that the outer ends 16 and 18 are biased towards the hood 11. In other words, the apex angle of the shield is less than the apex angle of the hood. The center portion 20 has been pressed inwardly in FIGURE 3 by the emblem 22 attached to the hood 11. The emblem 22 is preferably tightened, so as to press the portion underlying the emblem against the hood 11, the outer ends of the shield being supported by the dents 14. The balance of the shield, aside from the dents 14 and the portion underlying the emblem 22, is out of contact with the remaining underlying surface of the hood 11.

On some makes of automobiles and trucks, letters forming the name of the automobile are mounted on the forward end of the hood 31. In FIGURE 4 the name "OLDSMOBILE" has been shown for the purpose of illustration. This name happens to have an even number of letters and, that being the case, there is no letter directly in the center of the hood 31. That being the case, two of the letters may be used to secure the shield in position. In the illustration shown, the two letters L are used to clamp the shield in position. In the shield 30, all of the letters excepting the two L's are mounted within outwardly projecting portions 32 of the shield 30 encircling the underlying letters, the portions 34 between adjacent enclosed letters being spaced a slight distance from the hood. Due to the transparency of the shield, the letters that are enclosed by the shield are plainly visible. The two L's are located in horizontal portions 36 that are clamped against the underlying surface of the hood. In the event there is an odd number of letters, as for example, in the name "DODGE", then the center letter D could be used to hold the shield in position, functioning as an emblem, as described in connection with the embodiment shown in FIGURES 1, 2, 3 and 6.

This shield is inexpensive, is easily manufactured, easily installed and replaced. It is much cheaper to replace the shield than it is to repaint the entire hood of a motor vehicle.

The upper flange 12 in the preferred embodiment and the flange 40, as shown in FIGURE 4, tend to deflect the air stream and with it bugs and other foreign matter, tending to hit the windshield. However, the primary purpose of this shield is to protect the paint on the forward portion of the hood.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined by the appended claims.

Having thus described my invention, I claim:

1. A protective shield for protecting the forwardly extending portion of the hood of an automobile comprising a sheet of plastic material formed substantially to the contour of the forwardly directed portion of the hood, the upper edge of the shield being deflected to form an air deflecting portion, the horizontal ends of the shield having dents resting against the margins of the hood, an emblem of the automobile clamping the underlying portion of the shield against the hood of the automobile.

2. A protective shield according to claim 1, wherein the emblem consists of a letter of a word on the forward portion of the hood.

3. A protective shield according to claim 1, wherein the shield has outwardly projecting portions enclosing at least a portion of the letters of a word on the front of the hood and wherein at least one letter of the word is located on the outside of the shield to clamp it to the hood.

References Cited in the file of this patent

UNITED STATES PATENTS

| | | |
|---|---|---|
| 1,824,751 | Steinman | Sept. 22, 1931 |
| 2,525,595 | Fergueson | Oct. 10, 1950 |
| 2,790,676 | McMurray | Apr. 30, 1957 |
| 2,792,254 | Hagglund | May 14, 1957 |
| 2,793,705 | Garrity | May 28, 1957 |
| 2,857,973 | Garrity | Oct. 28, 1958 |

OTHER REFERENCES

Life Magazine, May 21, 1951, page 66.